US00RE42812E

(19) United States
(12) Reissued Patent
Bealkowski

(10) Patent Number: US RE42,812 E
(45) Date of Reissued Patent: Oct. 4, 2011

(54) APPARATUS FOR PROVIDING I/O SUPPORT TO A COMPUTER SYSTEM AND METHOD OF USE THEREOF

(75) Inventor: Richard Bealkowski, Redmond, WA (US)

(73) Assignee: Raritan, Inc., Somerset, NJ (US)

(21) Appl. No.: 11/361,039

(22) Filed: Feb. 23, 2006

Related U.S. Patent Documents

Reissue of:
(64) Patent No.: 6,697,905
Issued: Feb. 24, 2004
Appl. No.: 09/548,585
PCT Filed: Apr. 13, 2000

(51) Int. Cl.
*G06F 13/00* (2006.01)

(52) U.S. Cl. ..... 710/316; 710/37; 710/38; 710/303; 710/304; 709/216; 709/226

(58) Field of Classification Search ..... 710/2, 10, 710/62, 100, 316, 37, 38, 303, 304; 709/213, 709/228, 216, 226; 700/5; 345/1.2; 375/214
See application file for complete search history.

(56) References Cited

U.S. PATENT DOCUMENTS 5,193,174 A * 3/1993 Bealkowski et al. ..... 710/104
5,280,585 A * 1/1994 Kochis et al. ..... 710/48
5,287,461 A * 2/1994 Moore ..... 709/219
5,307,462 A * 4/1994 Hastings ..... 710/10
5,337,229 A * 8/1994 Holland et al. ..... 700/2
5,432,907 A * 7/1995 Picazo et al. ..... 709/249
5,566,306 A * 10/1996 Ishida ..... 710/309
5,584,008 A * 12/1996 Shimada et al. ..... 711/114
5,590,377 A * 12/1996 Smith ..... 710/22
5,680,536 A * 10/1997 Tyuluman ..... 714/1
5,712,975 A * 1/1998 Ooe ..... 709/219
5,721,842 A 2/1998 Beasley et al.
5,732,212 A 3/1998 Perholtz et al.
5,757,642 A * 5/1998 Jones ..... 700/5

(Continued)

OTHER PUBLICATIONS

Adder, Products Brochure, APX 304572-304579, Apr. 1, 1998, 8 pages.

(Continued)

*Primary Examiner* — Glenn A Auve
(74) *Attorney, Agent, or Firm* — Lackenbach Siegel, LLP

(57) ABSTRACT

An apparatus for providing I/O support to a computer system and a method of use thereof is disclosed. The apparatus in accordance with the present invention includes an internal control element located within the apparatus. The control element allows the apparatus in accordance with the present invention to relinquish ownership of the associated I/O devices for the purpose of being used by another computer. Accordingly, through the use of the apparatus in accordance with the present invention, expensive KVM switches and cabling, along with the accompanying I/O devices, are no longer needed to provide I/O support for computer networks. A first aspect of the present invention provides an apparatus for providing I/O support to a computer system. The apparatus comprises an I/O device and an internal control element coupled to the I/O device for relinquishing ownership of the I/O device from the apparatus to the computer network. A second aspect of the present invention provides a method for providing I/O support to a computer system. The method comprises the steps of providing an apparatus wherein the apparatus includes an I/O device and an internal control element coupled to the I/O device and utilizing the internal control element to allow ownership of the I/O device to be relinquished from the apparatus to the computer system.

52 Claims, 6 Drawing Sheets

U.S. PATENT DOCUMENTS

| | | | | |
|---|---|---|---|---|
| 5,848,292 | A * | 12/1998 | Nathan | 710/2 |
| 5,884,096 | A | 3/1999 | Beasley et al. | |
| 5,907,689 | A * | 5/1999 | Tavallaei et al. | 710/110 |
| 5,913,034 | A * | 6/1999 | Malcolm | 709/223 |
| 5,937,176 | A | 8/1999 | Beasley et al. | |
| 5,941,963 | A * | 8/1999 | Charles et al. | 710/62 |
| 6,073,188 | A * | 6/2000 | Fleming | 710/38 |
| 6,098,138 | A * | 8/2000 | Martinelli et al. | 710/315 |
| 6,112,264 | A | 8/2000 | Beasley et al. | |
| 6,308,239 | B1 * | 10/2001 | Osakada et al. | 710/316 |
| 6,321,346 | B1 * | 11/2001 | Murotani et al. | 714/47.3 |
| 6,345,323 | B1 | 2/2002 | Beasley et al. | |
| 6,378,009 | B1 * | 4/2002 | Pinkston et al. | 710/62 |
| 6,378,014 | B1 * | 4/2002 | Shirley | 710/100 |
| 6,401,124 | B1 * | 6/2002 | Yang et al. | 709/228 |
| 6,473,789 | B1 * | 10/2002 | Chen et al. | 709/213 |
| 6,516,385 | B1 * | 2/2003 | Satoyama et al. | 711/112 |
| 6,546,450 | B1 * | 4/2003 | Liu | 710/316 |
| 6,567,876 | B1 * | 5/2003 | Stufflebeam | 710/303 |
| 6,624,797 | B1 * | 9/2003 | Wheeler et al. | 345/1.2 |
| 6,744,810 | B1 * | 6/2004 | Iyer et al. | 375/214 |
| 6,771,213 | B2 | 8/2004 | Durst et al. | |
| 2002/0099899 | A1 * | 7/2002 | Shaw | 710/316 |
| 2002/0103951 | A1 * | 8/2002 | Huber et al. | 710/72 |
| 2002/0129136 | A1 * | 9/2002 | Matharu | 709/223 |

OTHER PUBLICATIONS

AdderViewOSD, Products Brochure, RCI 173246-173279, Aug. 1, 2002.
Avocent's Pre-Markman Hearing Memorandum in Support of its Proposed Claim Constructions (Dec. 15, 2004).
Avocent Redmond's Answering Pre-Markman Hearing Briefing (Jan. 18, 2005).
Avocent Redmond's Supplemental Responses to Raritan's Second Set of Post-Remand Interrogatories (Nos. 15R-17R), Mar. 14, 2005.
Apex, OutLook User Guide, 1997.
Apex et al., Products Brochure, APX 082949-083326, 1996.
Apex PC Solutions, Users Guide, 1993.
Apex, Products Brochure, APX 018983-018996, Jan. 7, 1997.
Apex, Products Brochure, APX 019103-019121, 1995-1996.
Apex, Products Brochure, APX 056304-056346, Oct. 1, 1998.
Apex's Sales Brochure, Sep. 1, 1998, 1 page.
Apex, SwitchBack User Guide, 1995.
Apex's Motion on the PolyCon Catalog and Supporting Memorandum, Jan. 15, 2002.
Apex's Proposed Markman Findings, Jan. 25, 2002.
Appendix1 to Apex's Proposed Markman Findings, Jan. 25, 2002.
Badman, Switching into High Gear, Network Computing, Apr. 30, 2001.
Belkin, The OmniView Pro User Manual, Jul. 16, 2001.
Bruce McNair Deposition Transcript, Case No. 01-CV-4435, May 5, 2005.
Compaq, White papers, 1996, APX 083313-APX 083326, APX 083335-APX 083389.
Ching-I Hsu Deposition Transcript, Case No. 01-CV-4435, Mar. 11, 2005.
Cybex, Director Installer/User Guide, Nov. 1996.
Cybex, 4 x P & 1 x P KVM Switches Guide to Applications, 1996.
Datavision, Product Brochure, 1992, 3 pages.
Declaration of Joseph C. McAlexander in Support of Apex's Motion for a Preliminary Injunction, Sep. 17, 2001.
Declaration of Joseph C. McAlexander, III in the Civil Action No. 01-CV-4435, Dec. 15, 2004.
Declaration of Sharad Malik, Ph. D., Jan. 8, 2002.
Declaration of Sharad Malik, Ph.D. (Jan. 18, 2005).
Defendant Raritan Computer Inc.'s Claim Construction Statement (Dec. 15, 2004).
Defendant Raritan Computer Inc.'s Motion for Partial Summary Judgment (Jan. 8, 2002).
Defendant Raritan Computer Inc.'s Proposed Findings of Fact and Conclusions of Law, Apr. 27, 2005.
Defendant Raritan Computer Inc.'s Reply to Avocent's Proposed Claim Constructions (Jan. 18, 2005).
Defendant Raritan Computer Inc.'s Response to Plaintiff's First Set of Post Remand Interrogatory Requirements to Raritan (No. 1R-16R). (Dec. 16, 2004).
Defendant Raritan Computer, Inc.'s Response to Plaintiff's Second Set of Interrogatories (Nos. 9-12), Oct. 30, 2001.
Defendant Raritan Computer, Inc.'s Second Set of Interrogatories to Plaintiff Apex, Nov. 16, 2001.
Defendant Raritan Computer, Inc.'s Supplemental Response to Plaintiff's First Set of Interrogatories (Nos. 9-12), Aug. 31, 2001.
Defendant Raritan Computer, Inc.'s Supplemental Response to Plaintiff's Second Set of Interrogatories (Nos. 9-12), Dec. 12, 2001.
DEI, Central Control of Multiple PCs Without Massive Cabling, product brochure, Nov. 1992.
Expert Report by Joseph C. McAlexander Regarding Infringement and Validity of U.S. Patent Nos. 5,884,096, 5,937,176 and 6,112,264, Jan. 3, 2001.
Expert Report of Michael H. Davis, Jan. 13, 2002.
Expert Report of Sharad Malik, Regarding Noninfringement and Invalidity of U.S. Patent Nos. 5,884,096, 5,937,176 and 6,112,264, Jan. 13, 2002. (Unexecuted).
File History of U.S. Patent No. 5,721,842, Feb. 24, 1998.
File History of U.S. Patent No. 5,732,212, Mar. 24, 1998.
File History of U.S. Patent No. 5,884,096, Mar. 16, 1999.
File History of U.S. Patent No. 5,937,176, Aug. 10, 1999.
File History of U.S. Patent No. 6,112,264, Aug. 29, 2000.
File History of Reissue U.S. Patent No. 5,732,212, Apr. 11, 2002.
File History of U.S. Appl. No. 10/032,325, Jun. 14, 2004.
Findings and Conclusions, *Apex* v. *Raritan*, Civil Action No. 01-CV-0035, Feb. 25, 2002.
Investor's Business Daily, Box Keeps Monitors, Mice to a Minimum, Sep. 8, 1997.
Joseph C. McAlexander Deposition Transcript, Case No. 01-CV-4435, Apr. 27, 2005.
KVM Switch History, Aug. 2, 2002, 2 pages.
KVM Switches Roundup, Windows NT Magazine, Jul. 1997.
Lan Times, The beauty of Apex is a two-sided story, Nov. 20, 1995.
Lightwave Communications, Inc., Product Brochure, APX 304594-304605, Jun. 1, 1998.
Lu, E&J Int. 4-Port KVM Switch, Jul. 4, 2001.
Marksman Transcript, *Avocent* v. *Raritan*, Civil Action No. 4435, Feb. 3, 2005.
Marksman Transcript, *Avocent* v. *Raritan*, Civil Action No. 4435, Feb. 4, 2005.
Memorandum and Order on Marksman issues, Case No. 01-CV-4435, (Mar. 11, 2005).
Network Computing, Product Brochure, May 15, 1995, 5 pages.
Network Technologies Inc., Product Brochure, 1998, 2 pages.
Network World, advisement, Jul. 6,1992.
Ocean Isle, Reachout Product Brochure, RCI 172996-173006, Jun. 1994.
PC World, New Products, May 1995, 2 pages.
PolyCon GmbH Data System Inc., product catalogs, APX 024328-042697, prior to Spring, 1995.
Press Release, Maintain Error-Free Central Control of 128 PCs from One Set of Keyboard, Mouse, and Monitor, Feb. 4, 1999, 1 page.
Protest Under 37 CFR 1.291 Filed in U.S. Appl. No. 08/969,723, Feb. 13, 1999.
Raritan, CompuSwitch, Mar. 16, 1998, 1 page.
Raritan, Dominion KSX, Jul. 19, 2003, RCI 139356-139371.
Raritan, Dominion KX and Dominion KSX, 2004, 181193-181211.
Raritan, MasterConsole MXU2, Jul. 31, 2001.
Raritan, MasterConsole II, User's Manual, 2000.
Raritan, Paragon UMT2161, RCI 147483-147505, Jul. 5, 2002.
Raritan, Paragon User's Guide, Jun. 15, 2000.
Raritan, Paragon II User Manual, 2004.
Raritan, Products Brochure, 2004-2005, p. 185899-185912.
Raritan, Product Introduction, Oct. 23, 2000.
Rebuttal Expert Report of Joseph C. McAlexander Regarding Validity and Infringement of U.S. Patent Nos. 5,884,096, 5,937,176 and 6,112,264, Apr. 11, 2005.
Rextron, Product Brochure, Aug. 1, 2002, 5 pages.
Rose Electronics, "Master Switch Installation and Operation Manual," 1991.

Rose Electronics, UltraView Installation and Operation Manual, 1991-1997.
Rose Electronics, Ultra View, Aug. 1, 2002, RCI 173332-173336.
Startech Computer Products Ltd., Product Press Release, APX 304618-304619, Feb. 1998.
Supplemental Expert Report of Bruce McNair Regarding United States Patent Nos. 5,884,096 & 6,112,264 and 5,937,176, Apr. 17, 2005.
Supplemental Expert Report of Joseph C. McAlexander Regarding Infringement of U.S. Patent Nos. 5,884,096, 5,937,176 and 6,112,264, Mar. 22, 2005.
Supplemental Expert Report of Michael H. Davis, Apr. 18, 2005.
SwitchCom, ProServer, Aug. 1, 2002, 2 pages.
Tikkler, Belkin OmniView SE 4-Port KVM Switch, Nov. 8, 2000.
Tony Dekerf and Gary D. Davis, "A Close Look At Modern Keyboard, Video & Mouse Switches," 1995.
Trial Transcript, *Apex* v. *Raritan*, Southern District of New York, Case No. 01-CV-4435, vol. 1-7, Jan. 2002.
Tron International, Inc., KVM Products Catalogs, 1997.
Tron International, Inc., Products Catalogs, 1996.
Tron International, Inc., Product Brochure, 1997, 4 pages.
Unisys, $PW^2$ Advantage Series Rackmount Server, 1995.
Wright Line, LMS Switch, 1994, 2 pages.
Yee Liaw Deposition Transcript, Case No. 01-CV-4435, Mar. 3, 2005.
Yee-Shung Liaw Deposition Transcript, Case No. 01-CV-4435, Dec. 6, 2001.
MSWindows 98 Resource Kit; Microsoft Professional Editions; The Technical Guide to Deploying Configuring and Supporting Windows 98 in Your Organization; Published by Microsoft Press; Redmond, WA 98052-6399; Copyright 1998 by Microsoft Corporation. Pertinent Pages: pp. 812-814.
Microsoft Computer Dictionary, $4^{th}$ Edition; Published by Microsoft Press; Redmond, WA 98052-6399; Copyright 1999 by Microsoft Corporation. Pertinent Page: p. 154, "drive mapping".

* cited by examiner

AMENDED
FIG. 3
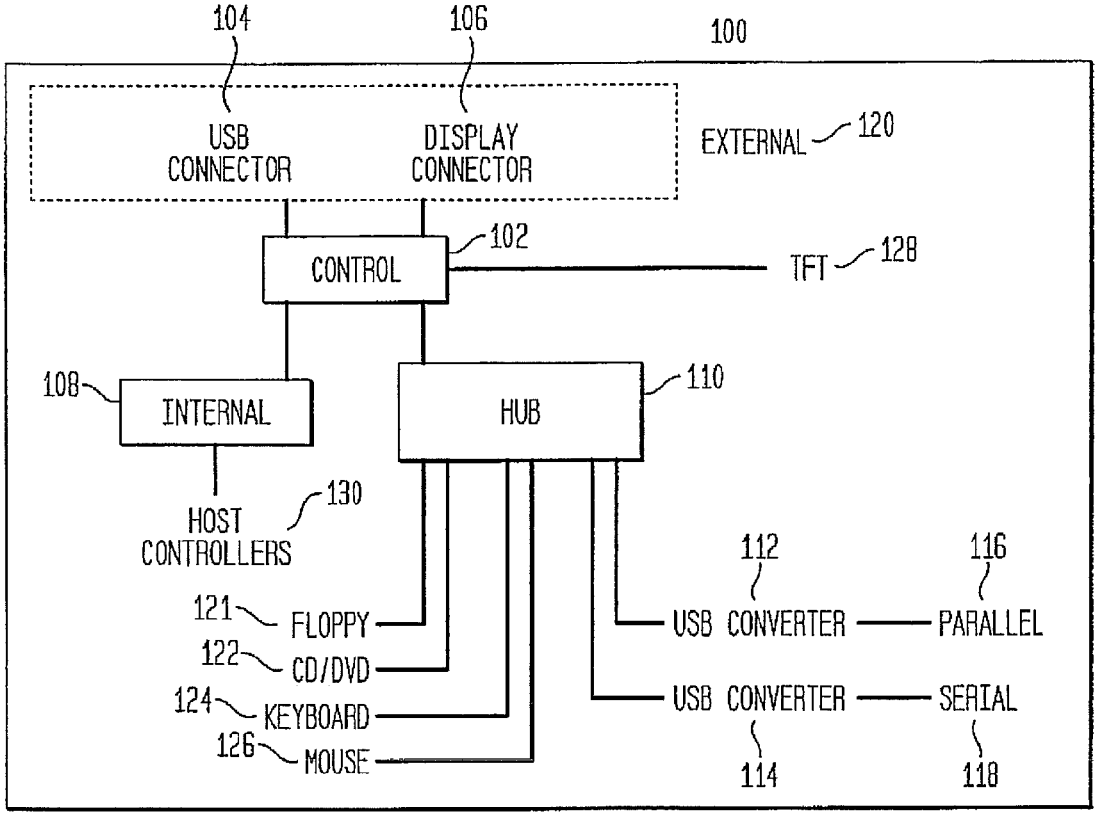

APPARATUS FOR PROVIDING I/O SUPPORT TO A COMPUTER SYSTEM AND METHOD OF USE THEREOF

Matter enclosed in heavy brackets [ ] appears in the original patent but forms no part of this reissue specification; matter printed in italics indicates the additions made by reissue.

FIELD OF THE INVENTION

The present invention relates generally to computer systems and more particularly to an apparatus for providing input/output support to a computer system.

BACKGROUND OF THE INVENTION

FIG. 1 illustrates a conventional computer system 10. Computer system 10 typically includes the main computer system 12, a keyboard 14, a mouse 16, a display device or monitor 18, a diskette or floppy drive 20 and a compact disc (CD) or digital versatile disc (DVD) drive 22. It is understood that computer system 10 is for illustrative purposes and includes numerous components not shown.

Large installation computer networks typically incorporate racks of server computers (servers) to provide services to the other computers within the networks. The functions performed by each of these servers vary depending on the network and the server's place within the particular network. For example, at least one server typically functions as "file server" for the network. A computer functioning as a file server will usually have significantly more data storage capacity than the other computers connected to the network. The networked computers utilize this data storage capacity to store files and databases. Software executed by the file server controls access to these files and databases.

Typically, each server within each rack would incorporate certain peripheral input/output (I/O) devices such as a keyboard, a mouse, a display device, a floppy disk drive and a CD/DVD drive. However, these I/O devices are not used, except at certain critical installation points or for routine computer maintenance. Therefore, within the context of a large computer network environment, they are characterized as low-use devices.

When setting up these large installation computer networks it is desirable to minimize cost as well as the amount of space used. Consequently, to minimize the space used by the low-use devices, a keyboard/video/mouse (KVM) switch is sometimes incorporated.

Through the use of a KVM switch, only one set of keyboard, mouse and display devices are utilized by the rack of servers. FIG. 2 illustrates a conventional KVM system 50 comprising a rack 52 populated with a number of server computers 54-68, switch 70, keyboard 14, mouse 16 and display device 18. The KVM switch 70 is cabled to each of the server computers 54-68 and to keyboard 14, mouse 16 and display device 18. If a computer operator or technician subsequently needs to access one of the server computers 54-68 in rack 52, KVM switch 70 is utilized to associate keyboard 14, mouse 16 and display device 18 with the appropriate server computer 54-68. The computer operator or technician is then able to use the keyboard 14, mouse 16, and display device 18 to interact with the appropriate server computer 54-68. However, due to the high cost of KVM switches and associated extensive cabling and the valuable rack space occupied, their utilization is less than desirable. Also note that the KVM system 50 does not address a solution for additional I/O such as the floppy drive 20 and CD/DVD drive 22 which is typically duplicated within each server 54-68 in rack 52.

Accordingly, what is needed is a low cost, space saving method and apparatus for providing I/O support for these and other types of systems. The present invention addresses such a need.

SUMMARY OF THE INVENTION

A first aspect of the present invention provides an apparatus for providing I/O support to a computer system. The apparatus comprises an I/O device and an internal control element coupled to the I/O device for relinquishing ownership of the I/O device from the apparatus to the computer system.

A second aspect of the present invention provides a method for providing I/O support to a computer system. The method comprises the steps of providing an apparatus wherein the apparatus includes an I/O device and an internal control element coupled to the I/O device and utilizing the internal control element to allow ownership of the I/O device to be relinquished from the apparatus to the computer system.

The use of the method and apparatus in accordance with the present invention saves space and money since expensive KVM switches, along with the accompanying I/O devices, are no longer needed to provide I/O support for computer networks.

BRIEF DESCRIPTION OF THE DRAWINGS

FIG. 3 shows an apparatus in accordance with the present invention.

DETAILED DESCRIPTION

Figure 1:
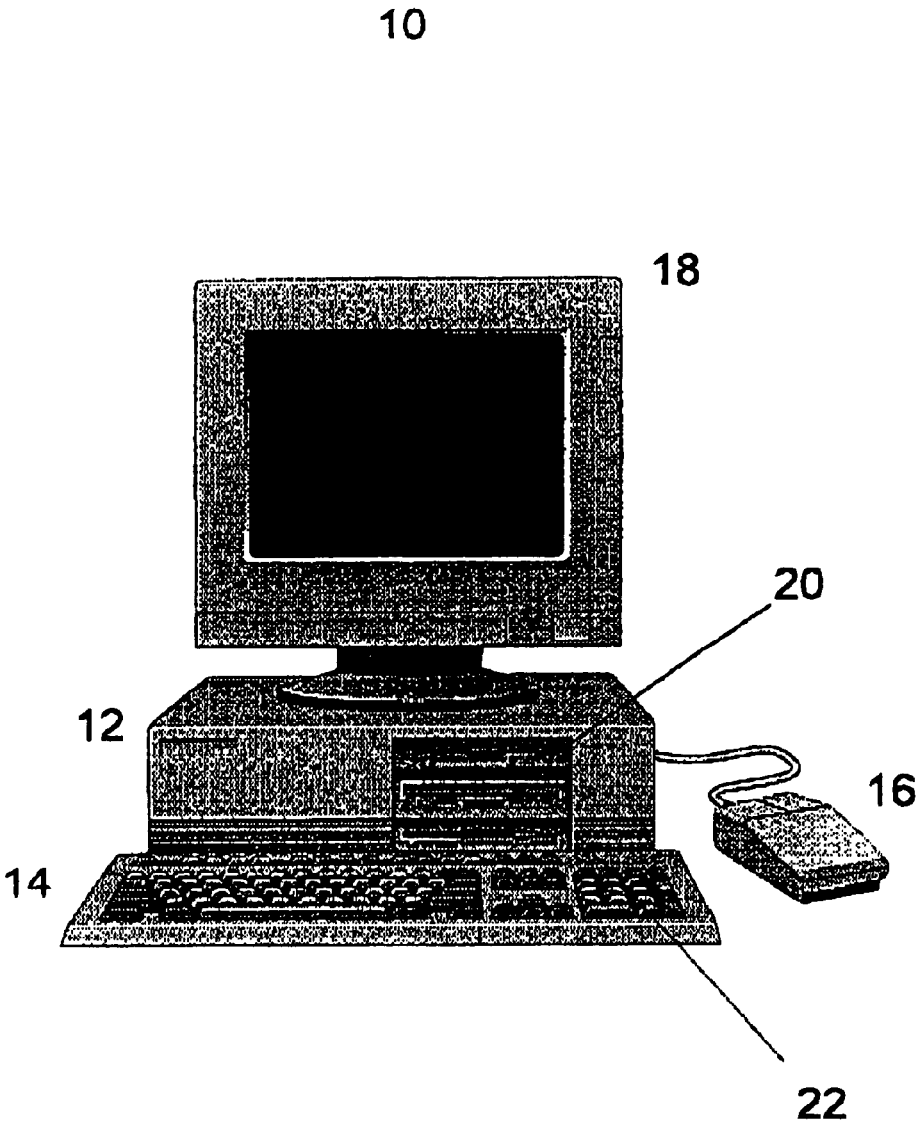
Fig 1 Prior Art
FIG. 1 illustrates a conventional computer system.
Figure 2:
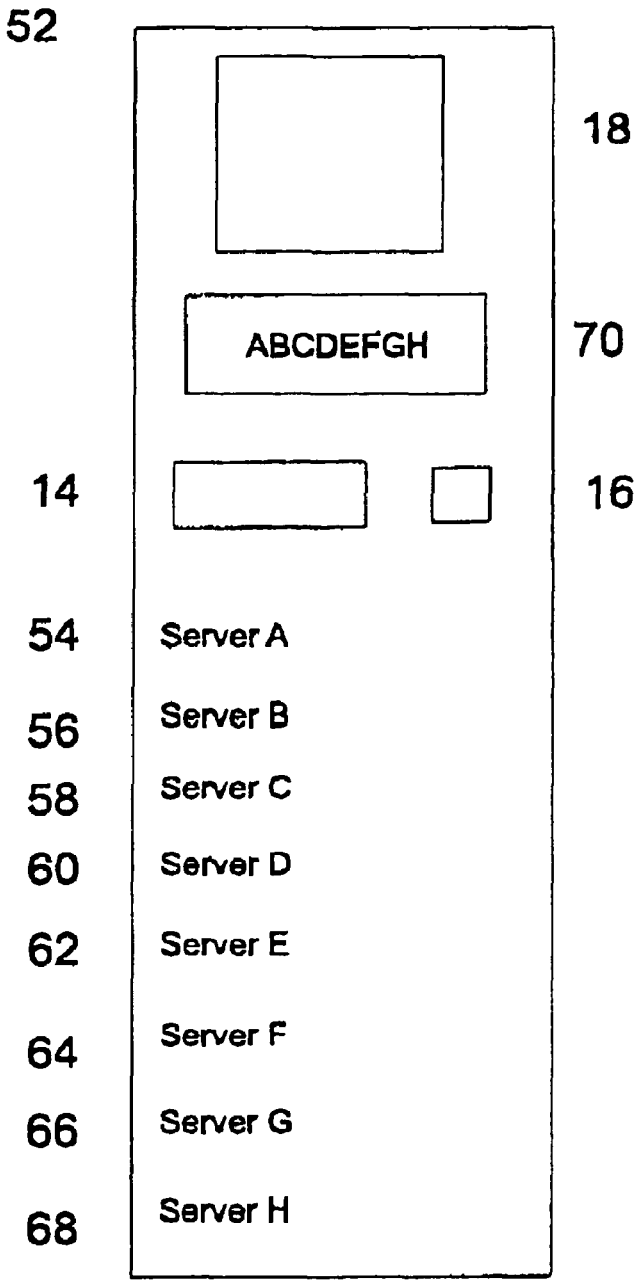
Fig 2 Prior Art
FIG. 2 illustrates a conventional KVM switching system.

The present invention relates to a method and apparatus for providing I/O support. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is disclosed in the context of a preferred embodiment. The preferred embodiment of the present invention is an apparatus for providing I/O support to a computer system and a method of use thereof. The apparatus in accordance with the present invention is an enhanced portable or notebook computer system (e.g. an enhanced IBM Thinkpad) that includes a low cost means for providing I/O support to another computer via a control mechanism located within the apparatus. The control mechanism allows the apparatus in accordance with the present invention to relinquish ownership of the I/O devices coupled thereto for the purpose of being used by another computer. Accordingly, through the use of the apparatus in accordance with the present invention, expensive KVM switches and cabling, along with the accompanying I/O devices, are no longer needed to provide I/O support for the computer networks.

For a further description of the apparatus in accordance with the present invention, please refer now to FIG. 3. FIG. 3 shows an apparatus 100 in accordance with the present invention. Apparatus 100 comprises control element 102, internal connection 108 coupled to host controllers 130, external connection 120 and display device 128. Display device 128 is preferable a thin film transistor (TFT) type display device. External connection 120 is further comprised of USB connector 104 and display device connector 106. Apparatus 100 is further comprised of hub 110 coupled to USB compatible devices floppy or diskette drive [120] *121*, CD or DVD drive 122, keyboard 124, mouse 126, parallel port 116 and serial port 118. Apparatus 100 also includes optional USB converter 112 and optional USB converter 114. Optional USB converter 112, 114 are shown to describe a methodology to bridge a USB subsystem to a potentially non-USB subsystem such as parallel port 116 and serial port 118. Preferably parallel port 116 and serial port 118 are native USB type devices thus eliminating the need for any converters 112, 114.

Control element 102 is coupled to internal connection 108 and external connection 120. Control element 102 is further connected to TFT 128 and hub 110. Control element 102 operates in one of two modes, internal or host mode and external or hub mode. In host mode control element 102 electrically couples internal connection 108 to TFT 128 and hub 110. In hub mode control element 102 electrically couples external connection 120 with TFT 128 and hub 110.

In alternate embodiments external connection 120 can be comprised of a single high speed serial connection such as IEEE 1394. Selection of a single high speed serial connection such as IEEE 1394 is based on such factors as commercial acceptance of the IEEE 1394 standard and the internal architecture of apparatus 100.

When operating in host mode, the apparatus 100 owns all of the I/O devices and operates in a normal fashion (i.e. as a typical notebook computer system). For the purposes of this application, an I/O device is owned by a computer if the I/O device is recognized and dedicated for use by the computer. Hence, when an I/O device, such as a visual display device, is owned by a designated computer, the visual display device only displays information related to the designated computer. Accordingly, in the host mode, the internal connection 108 recognizes the I/O devices TFT 128 and hub 110 and dedicates their use to apparatus 100.

In the hub mode,the apparatus 100 relinquishes ownership of the I/O devices and makes them available for use by another system. While apparatus 100 is operating in hub mode another system (not shown) cabled to external connection 120 could recognize and utilize the I/O devices TFT 128 and hub 110 via control 102 and further access floppy drive [120] *121*, CD/DVD drive 122, keyboard 124, mouse 126, parallel port 116 and serial port 118 via hub 110. Thus, the visual display device TFT 128 essentially becomes a standalo visual display device capable of receiving input signals from another system (not shown). And I/O devices floppy drive 120, CD/DVD drive 122, keyboard 124, mouse 126, parallel port 116 and serial port 118 essentially become dedicated "local" I/O devices for another system (not shown). Accordingly, a computer technician or other operator needs only the apparatus 100 and two cables (a USB cable and a display cable) to provide I/O support to a server computer.

Please note that in either mode of apparatus 100, host mode or hub mode, the apparatus 100 in accordance with the present invention retains its native computing capabilities including computer processor, memory, and networking functions.

Figure 4:
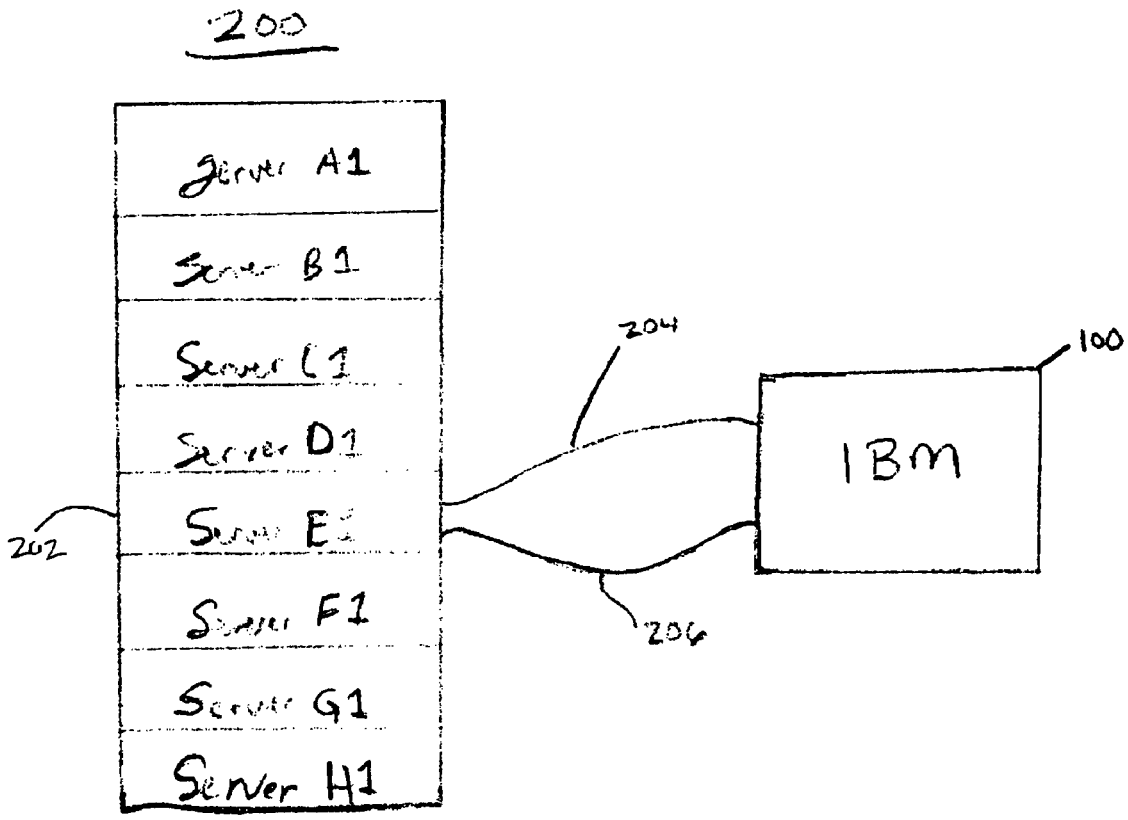
FIG. 4 is an illustration of the utilization of the apparatus 100 in accordance with the present invention.

FIG. 4 is an illustration of the utilization of the apparatus 100 in accordance with the present invention. FIG. 4 shows a rack of servers 200 wherein one of the servers 202 is coupled to the apparatus 100 in accordance with the present invention via a USB cable 204 and a display cable 206. Consequently, a set of stand-alone I/O devices (and associated space within the rack) are not needed to provide I/O support for the rack of servers 200. In addition, a floppy drive and CD/DVD drive and certain other I/O devices are no longer, required to be included in each server in rack 200.

Although the preferred embodiment of the present invention is described in the context of being used with cable-type connectors, one of ordinary skill in the art will readily recognize that a variety of coupling means could be utilized. For example, the present invention could be implemented via a sufficiently high bandwidth infrared or wireless type coupling means while remaining within the spirit and scope of the present invention.

The switching of the apparatus 100 from hub mode to host mode or vice versa can be to done in a variety of ways. Preferably the mode changes are accomplished through some type of function key (Fn) sequence. For example, the key sequence Fn+F1 could be designated for host/hub mode changes. However, one of ordinary skill in the art will readily recognize that the host/hub mode change could be implemented in a variety of ways while remaining within the spirit and scope of the present invention.

Figure 5:
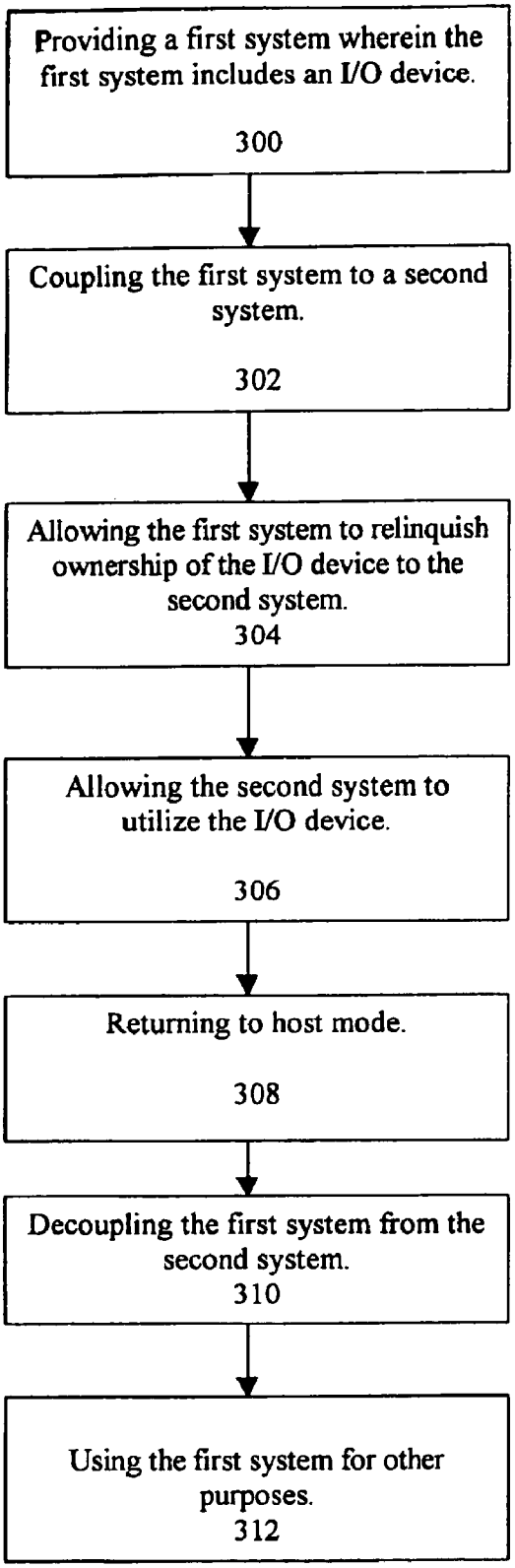
FIG. 5 is a flowchart of a method of using an apparatus in accordance with the present invention.

For a better understanding of the present invention, please refer to FIG. 5. FIG. 5 is a flowchart of a method of using an apparatus in accordance with the present invention. The method begins by providing a first system wherein the first system includes an I/O device, via step 300. Next, the apparatus in accordance with the present invention is coupled to a second system, via step 302. Next, ownership of the I/O device is relinquished from the first system to the second system, via step 304. Preferable, ownership of the I/O device is relinquished based upon a triggering event, i.e. a user interaction. Preferably, the triggering event is the performance of some type of function key sequence. The second system utilizes the I/O device as required, via step 306. The apparatus in accordance with the present invention is then switched back to host mode, via step 308. The apparatus of the present invention is then decoupled from the second system, via step 310. Finally, via step 312, the apparatus in accordance with the present invention is removed, potentially for other subsequent uses.

Although the above-outlined description contemplates utilizing the apparatus in accordance with the present invention as a means for providing I/O support to a rack of server computers, the scope of the implementation of the present invention is not limited to server computer support. The apparatus in accordance with the present invention could also be employed to provide I/O support for a single computer system such as a typical desk-top or desk-side computer system.

Many computer users today have an office computer system and a portable or laptop computer system. The apparatus 100 in accordance with the present invention can be used to improve the affordability of office systems as well. An office system which employs apparatus 100 in accordance with the present invention can be deployed at a significantly reduced cost by eliminating potentially redundant keyboard, mouse, display, floppy drive, CD/DVD drive, etc. devices.

Figure 6:
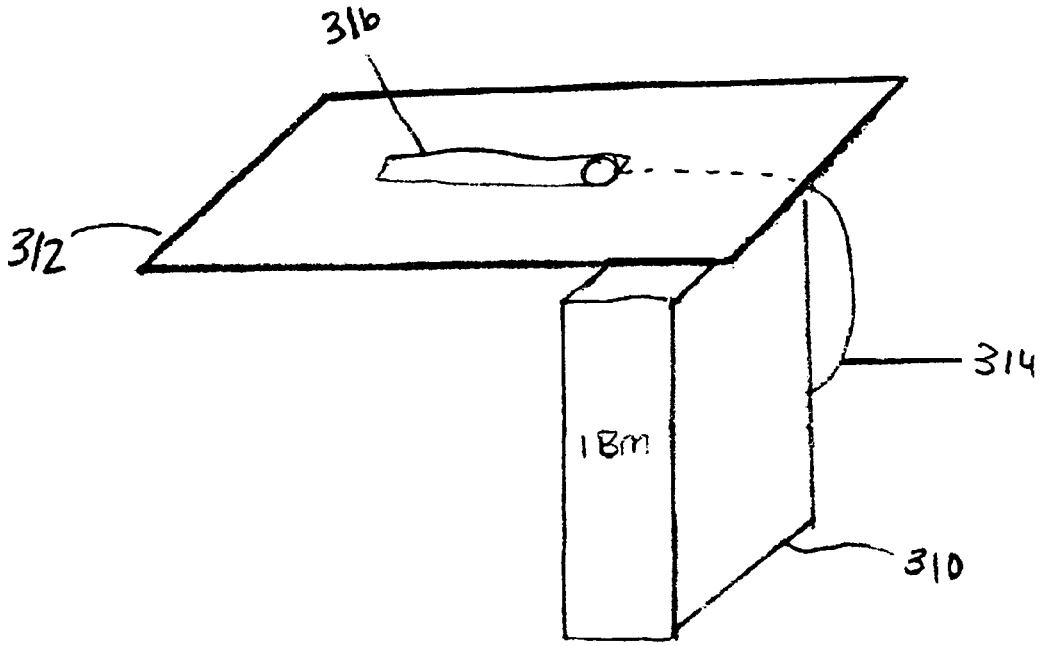
FIG. 6 is an illustration of the utilization of the apparatus in accordance with the present invention wherein the apparatus provides I/O support for a single computer system.

FIG. 6 is an illustration of the utilization of the apparatus in accordance with the present invention wherein the apparatus provides I/O support for a single computer system 310. The computer system 310 is preferably coupled to a dock 312 via coupling device 314. Preferable, coupling device 314 comprises a cable. Dock 312 further comprises docking port 316. Docking port 316 is compatible with apparatus 100. Accordingly, once apparatus 100 is coupled to docking port 316, the I/O devices that are recognized by the apparatus 100, are now capable of being recognized by the computer system 310. Thus, a conventional keyborad mouse, stand-alone monitor, floppy drive, CD/DVD drive, etc. are no longer required to be provided as integral elements of computer system 310.

The apparatus in accordance with the present invention provides a low cost means for providing I/O support to another system via a switching mechanism located within the apparatus. The switching mechanism allows the apparatus in accordance with the present invention to relinquish ownership of the I/O devices coupled thereto for the purpose of being used by the other system. The use of the apparatus in accordance with the present invention saves space and money since the expensive KVM switches and associated cables, along with accompanying I/O devices, are no longer needed to provide I/O support for computer networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit of the appended claims.

What is claimed is:

1. An apparatus in a host computer system for enabling the host computer system to provide I/O support to a second computer system, wherein the host computer system includes a plurality of host controllers and a plurality of I/O devices, the apparatus comprising:

a first connecting port for directly coupling the second computer system to the host computer system;

an internal control element coupled to the plurality of I/O devices and to the first connecting port, wherein the plurality of I/O devices comprises a display [and] a keyboard*, and a USB device*; and a second connecting port for coupling the plurality of host controllers in the host computer system to the internal control element, wherein the internal control element regulates control of the plurality of I/O devices by the second computer system and the host computer system via the first and second connecting ports respectively.

2. The apparatus of claim 1 wherein the apparatus further includes a hub coupled to the internal control element.

3. The apparatus of claim 1 wherein the first connecting port comprises a universal serial bus connector.

4. The apparatus of claim 3 wherein the first connecting port further comprises a display device connector.

5. The apparatus of claim 1 wherein the first connecting port for coupling the second computer system directly to the host computer system comprises [a] an infra red type connector.

6. The apparatus of claim 1 wherein the first connecting port for coupling the second computer system directly to the host computer system comprises a wireless type connector.

7. The apparatus of claim 4 wherein the internal control element further includes means for coupling a visual display device to the apparatus.

8. The apparatus of claim [5] *7* wherein the visual display device is a thin film transistor-type visual display device.

9. The apparatus of claim 2 wherein the apparatus is capable of operating in one of at least two modes.

10. The apparatus of claim 9 wherein the at least two modes comprise a host mode and a hub mode.

11. The apparatus of claim 10 wherein the internal control element is capable of switching the at least two modes.

12. The apparatus of claim 11 wherein if the apparatus is operating in the host mode, the plurality of I/O devices are controlled by the host computer system.

13. The apparatus of claim 12 wherein if the apparatus is operating in the hub mode, the plurality of I/O devices are controlled by the second computer system.

14. The apparatus of claim 13 wherein the second computer system comprises at least one computer.

15. An apparatus in a host computer system for enabling the host computer system to provide I/O support to a second computer system, wherein the host computer system includes a plurality of host controllers and a plurality of I/O devices, the apparatus comprising:

a first connecting port for directly coupling the second computer system to the host computer system;

a hub coupled to the plurality of I/O devices, wherein the plurality of I/O devices comprises a display [and], a keyboard*, and a USB device*;

an internal control element coupled to the hub and to the first connecting port; and a second connecting port for coupling the plurality of host controllers in the host computer system to the internal control element, wherein the internal control element regulates control of the plurality of I/O devices by the second computer system and the host computer system via the first and second connecting ports respectively.

16. The apparatus of claim 15 wherein the internal control element further includes means for coupling a visual display device to the apparatus.

17. The apparatus of claim 16 wherein the visual display device is a thin film transistor-type visual display device.

18. The apparatus of claim 15 wherein the apparatus is capable of operating in one of at least two modes.

19. The apparatus of claim 18 wherein the at least two modes comprise a host mode and a hub mode.

20. The apparatus of claim 19 wherein the internal control element is capable of switching the at least two modes.

21. The apparatus of claim 20 wherein if the apparatus is operating in the host mode, the plurality of I/O devices are controlled by the host computer system.

22. The apparatus of claim 21 wherein if the apparatus is operating in the hub mode, the plurality of I/O devices are controlled by the second computer system.

23. The apparatus of claim 22 wherein the second computer system comprises at least one computer.

24. An apparatus in a host computer system for enabling the host computer system to provide I/O support to a second computer system, wherein the host computer system includes a plurality of host controllers and a plurality of I/O device, the apparatus comprising:

a hub coupled to the plurality of I/O devices, wherein the plurality of I/O [device] *devices* comprises a display [and], a keyboard*, and a USB device*;

an internal control element coupled to the hub, the internal control element including means for switching the apparatus to one of at least two operational modes, the at least two operational modes comprising a host mode and a hub mode wherein if the apparatus is operating in the host mode, the plurality of I/O devices are controlled by the host computer system and if the apparatus is operating in the hub mode, the plurality of I/O devices are controlled by the second computer system;

a first connecting port coupled to the internal control element for coupling the second computer system directly to the host computer system, the first connecting port comprising a universal serial bus connector and a display device connector; and a second connecting port coupled to the internal control element and to the plurality of host controllers in the host computer system for coupling the host controllers to the plurality of I/O devices.

25. A method of providing I/O support by a host computer system to a second computer system, wherein the host computer system includes a plurality of host controllers and a plurality of I/O devices, the method comprising the steps of:

a) directly coupling the second computer system to the host computer system via first connecting port in the *host* computer system;

b) providing an internal control element in the host computer system coupled to the first connecting port and to the plurality of I/O devices, wherein the plurality of I/O devices comprises a display [and], a keyboard, *and a USB device*;

c) coupling the plurality of host controllers in the host computer system to the internal control element via a second connecting port in the computer system; and d) utilizing the internal control element to regulate control of the plurality of I/O devices by the second computer system and the host computer system via the first and second connecting ports respectively.

26. The method of claim 25 wherein the host computer system further comprises a hub coupled to the plurality of I/O devices and to the internal control element.

27. The method of claim 26 wherein the host computer *system* is capable of operating in one of at least two operational modes.

28. The method of claim 27 wherein the internal control element is capable of switching the host computer system to one of the at least two operational modes.

29. The method of claim 28 wherein step b) further comprises:

b1) coupling the internal control element directly to the second computer system; and b2) utilizing the internal control element to switch the host computer system to one of the at least two operational modes.

30. The method of claim 29 wherein the at least two operational modes comprise a host mode and a hub mode.

31. The method of claim 30 wherein step b2) further comprises:

b2i) switching to the host mode; and b2ii) allowing the host computer system to control the plurality of I/O devices.

32. The method of claim 31 wherein step b2i) is provided in response to an interaction with the host computer system.

33. The method of claim 30 wherein step b2) further comprises:

b2i) switching to the hub mode; and b2ii) allowing the second computer system to control the plurality of I/O devices.

34. The method of claim 33 wherein step b2i) is provided in response to an interaction with the host computer system.

35. A processing system for providing I/O support to one of a plurality of network server computers, wherein the processing system includes a plurality of host controllers and a plurality of I/O devices, the processing system comprising:

a first connecting port for directly coupling the one network server computer to the processing system;

an internal control element coupled to the plurality of I/O devices and to the first connecting port, wherein the plurality of I/O devices comprises a display [and], a keyboard, *and a USB device*; and a second connecting port for coupling the plurality of host controllers in the processing system to the internal control element, wherein the internal control element regulates control of the plurality of I/O devices by the one network server computer and the processing system via the first and second connecting ports respectively.

36. The processing system of claim 35 wherein the processing system further includes a hub coupled to the internal control element.

37. The processing system of claim 36 wherein the first connecting port comprises a universal serial bus connector and a display device connector.

38. The processing system of claim 36 wherein the first connecting port for coupling the processing system directly to the one network server computer comprises an infra red type connector.

39. The processing system of claim 36 wherein the first connecting port for coupling the processing system directly to the one network server computer comprises a wireless type connector.

40. The processing system of claim 36 wherein the processing system is capable of operating in one of at least two modes.

41. The processing system of claim 40 wherein the at least two modes comprise a host mode and a hub mode.

42. The processing system of claim 41 wherein the internal control element is capable of switching the at least two modes.

43. The processing system of claim 42 wherein if the processing system is operating in the host mode, the plurality of I/O devices are controlled by the processing system.

44. The processing system of claim 43 wherein if the processing system is operating in the hub mode, the plurality of I/O devices are controlled by the one network server computer.

*45. A processing system for providing I/O support to one of a plurality of network server computers, wherein the processing system includes a plurality of host controllers and a plurality of I/O devices, the processing system comprising:*

*a first connecting port for directly coupling the one network server computer to the processing system;*

*an internal control element coupled to the plurality of I/O devices and to the first connecting port, wherein the plurality of I/O devices comprises a display, a keyboard and a USB connecter; and*

*a second connecting port for coupling the plurality of host controllers in the processing system to the internal control element,*

*wherein the internal control element regulates control of the plurality of I/O devices by the one network server computer and the processing system via the first and second connecting ports respectively.*

*46. The processing system of claim 45, wherein the USB connector is electrically coupled to a USB device.*

*47. A processing system for providing I/O support to one of a plurality of network server computers, wherein the processing system includes a plurality of host controllers and a plurality of I/O devices, the processing system comprising:*

*a first connecting port for directly coupling the one network server computer to the processing system;*

*an internal control element coupled to the plurality of I/O devices and to the first connecting port, wherein the plurality of I/O devices comprises a display, a keyboard and a USB device controlled by at least one of the plurality of host controllers;*

*a second connecting port for coupling the plurality of host controllers in the processing system to the internal control element, and*

*wherein the internal control element regulates control of the plurality of I/O devices by the one network server computer and the processing system via the first and second connecting ports respectively.*

*48. A processing system for providing I/O support to one of a plurality of network server computers, wherein the processing system includes a plurality of host controllers and a plurality of I/O devices, the processing system comprising:*

*a first connecting port for directly coupling the one network server computer to the processing system;*

*an internal control element coupled to the plurality of I/O devices and to the first connecting port, wherein the plurality of I/O devices comprises a display, a keyboard and a USB device; and*

*a second connecting port for electrically coupling the plurality of host controllers in the processing system to the internal control element,*

*wherein the internal control element regulates control of the plurality of I/O devices by the one network server computer and the processing system via the first and second connecting ports respectively.*

*49. A processing system for providing I/O support to one of a plurality of network server computers, wherein the processing system includes a plurality of host controllers and a plurality of I/O devices, the processing system comprising:*

*a first connecting port for directly coupling the one network server computer to the processing system;*

*an internal control element coupled to the plurality of I/O devices and to the first connecting port, wherein the plurality of I/O devices comprises a display, a keyboard and a USB device; and*

*a second connecting port for electrically coupling the plurality of host controllers in the processing system to the internal control element,*

*wherein the internal control element regulates control of the plurality of I/O devices by the one network server computer and the processing system via the first and second connecting ports respectively; and*

*wherein the processing system is capable of operating in one of at least two modes, a host mode and a hub mode,*

*wherein the internal control element is capable of switching the at least two modes; and*

*wherein if the processing system is operating in the host mode, the plurality of I/O devices are controlled by the processing system, and if the processing system is operating in the hub mode, the plurality of I/O devices are controlled by the one network server computer.*

*50. The processing system of claim 49, wherein the first connecting port for directly coupling includes an external connection.*

*51. The processing system of claim 50, wherein the external connection includes a display cable and a USB cable directly coupling to the one network server.*

*52. The processing system of claim 51, wherein in the second connecting port for electrically coupling includes an internal connection which electrically couples the host controllers to the I/O devices via the internal control element.*

* * * * *